United States Patent [19]

Walz

[11] Patent Number: 4,822,267

[45] Date of Patent: Apr. 18, 1989

[54] APPARATUS FOR PRODUCING SUPERFINE POWDER IN SPHERICAL FORM

[76] Inventor: Alfred Walz, Am Kurzarm 7, D-7830 Emmendingen, Fed. Rep. of Germany

[21] Appl. No.: 906,018

[22] Filed: Sep. 11, 1986

[30] Foreign Application Priority Data

Sep. 24, 1985 [DE] Fed. Rep. of Germany ....... 3533964

[51] Int. Cl.$^4$ ............................................. B29B 9/00
[52] U.S. Cl. .............................................. 425/7; 65/7; 75/0.5 C; 264/12; 264/15; 264/25
[58] Field of Search .................. 425/6, 7; 264/12, 13, 264/14, 5, 83, 25, 211.17, 211.2, 15, DIG. 75; 419/23; 65/21.2, 325, 326, 5, 12, 16, 7, 13, 21.3; 75/0.5 C

[56] References Cited

U.S. PATENT DOCUMENTS

| | | | |
|---|---|---|---|
| 2,433,000 | 12/1947 | Manning | 264/DIG. 75 |
| 2,437,263 | 3/1948 | Manning | 264/DIG. 75 |
| 2,673,121 | 3/1954 | Brennan | 264/12 |
| 3,344,469 | 10/1967 | Bylund et al. | 425/7 |
| 3,843,340 | 10/1974 | Cane | 65/21.2 |
| 3,872,193 | 3/1975 | Smith | 264/8 |
| 4,211,736 | 7/1980 | Bradt | 425/7 |
| 4,486,161 | 12/1984 | Middleton | 264/12 |
| 4,534,917 | 8/1985 | Walz | 425/7 |
| 4,544,404 | 10/1985 | Yolton et al. | 264/12 |
| 4,631,013 | 12/1986 | Miller | 264/12 |
| 4,642,262 | 2/1987 | Piotrowski et al. | 264/12 |

FOREIGN PATENT DOCUMENTS

| | | | |
|---|---|---|---|
| 481642 | 12/1916 | France | 425/6 |
| 187655 | 6/1957 | Sweden | 264/12 |

Primary Examiner—Jay H. Woo
Assistant Examiner—C. Scott Bushey
Attorney, Agent, or Firm—Browdy and Neimark

[57] ABSTRACT

Apparatus for producing superfine powder in spherical form with a diameter of about 5 to 30 microns in a laval nozzle system. The material to be powdered is melted in a crucible, and is then superheated after it emerges from the crucible.

13 Claims, 2 Drawing Sheets

U.S. Patent  Apr. 18, 1989  Sheet 1 of 2  4,822,267
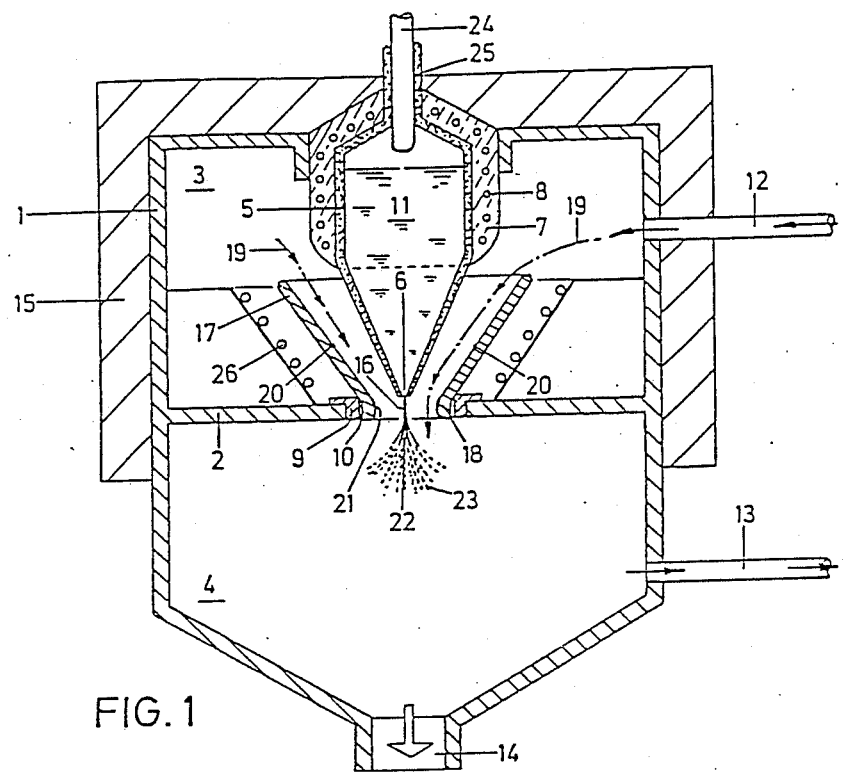
FIG. 1
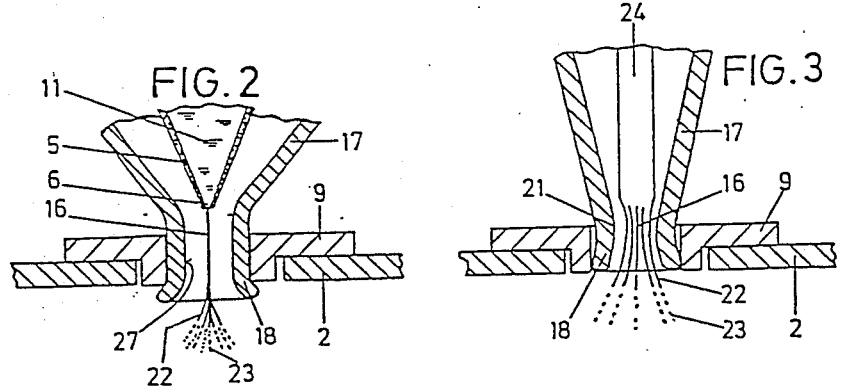
FIG. 2
FIG. 3

APPARATUS FOR PRODUCING SUPERFINE POWDER IN SPHERICAL FORM

FIELD OF THE INVENTION

The invention relates to a method of producing superfine powder in diameters ranging from about 5 to 30 μm from molten metals, metal alloys or ceramic materials in a rotationally symmetrical Laval nozzle system through which a propellant gas flows, and also to an apparatus for carrying out the method.

BACKGROUND OF THE INVENTION

DE-PS 22 37 884 and associated U.S. Pat. Nos. 4,001,357 and 4,060,355 disclose a rule for optimizing the geometrical form of a Laval supersonic nozzle arrangement in the flow direction as a function of the properties of the molten material. It must be stressed as an essential feature of this optimizing rule, which is intended for the production of fibres, that when the primary molten jet enters the expansion zone, i.e. after it passes through the narrowest cross-section at mach 1, and after formation of the bundle of fibres, consisting of several secondary molten fibers of μm diameter, cooling and solidification in the expansion zone must take place very rapidly. In any case, this solidification occurs already prior to hydrodynamic instability, causing a collapse into tiny balls or droplets.

To optimize a supersonic propellant gas apparatus to produce superfine powder in diameters ranging from about 5 to 30 μm from the molten materials mentioned at the outset, it is necessary, according to the rules of the procedure disclosed in U.S. Pat. No 4,534,917, to keep the molten batch fluid by supplying heat to this area (instead of a rapid cooling of the bundle of secondary threads). This is accomplished most expediently by means of radiant heat.

An important condition is that the propellent medium flow should be kept laminar.

Therefore, the invention solves the problem of indicating a method whereby the necessary supply of heat and the laminar flow pattern of the propellent medium is ensured, so as to guarantee the formation of superfine powder particles by preventing the formation of larger diameter drops.

SUMMARY OF THE INVENTION

This problem is resolved by melting the subject material in a crucible and superheating the material after it emerges from the crucible.

By virtue of the separation of the actual melting process from the superheating process, which takes place only immediately prior to acceleration of the molten stream in the Laval nozzle, a particularly fine splitting of the monofilament molten material is achieved. The molten monofilar material is, in the region of its surface, accelerated in microseconds to approx 100 m/s by shearing stresses of the supersonic gas flow acting upon it. The forces arising thereby exceed the surface tension of the molten material by about three magnitudes. This prevents relatively large droplets from forming. The molten monofilament then enters an area of relatively low pressure while in this surface-accelerated state.

The great pressure differential between the central zone of the monofilament and a highly accelerated surface results in the monofilament bursting apart into a bundle of very thin fibres which then, due to surface tension phenomena which lead to a stabilizing of the shearing forces, break down into ultrafine powder particles, the diameters of which are at least one magnitude smaller than the diameter of the starting monofilament.

It is obvious that a very fine temperature gradation is necessary to maintain this process, in order to keep the temperature of the molten batch at a sufficiently high level that after the splitting apart of the monofilament described in detail hereinabove the thin threads remain fluid. This is achieved by the radiant heat which acts on the threads.

Superheating of the molten jet is carried out in a particularly favorable manner by heating a propellent gas feeder funnel which focuses its radiated heat on its axis of rotation. Advantageously, the propellent gas feeder funnel can be inductively heated.

The radiant heat can act on the emergent melt in a particularly favorable way if a conical aperture forming an annular gap is provided on the melting crucible, since then the molten mass first runs along a runoff spigot (in other words outside the actual crucible which is only used for melting), the superheating process having been started in the region of the runoff spigot. It is particularly convenient that in the region of the closure spigot the molten material is exposed to the radiant heat as a thin film and over a very large area. This superheating process depends greatly on the thickness of the molten flow, which is why, for a controlled variation of the clear width of the annular gap, the closure part is advantageously axially displaceable in the aperture.

DESCRIPTION OF THE DRAWINGS

The invention is explained in greater detail hereinafter with reference to advantageous embodiments shown in the accompanying drawings, in which:

FIG. 1 shows a cross-section through an apparatus for carrying out the method of the invention;

FIG. 2 shows a modified embodiment of a Laval type of nozzle;

FIG. 3 shows a partial detail of an apparatus similar to FIG. 1 for non-crucible melting;

Detailed Description of the Invention

Figure 4:
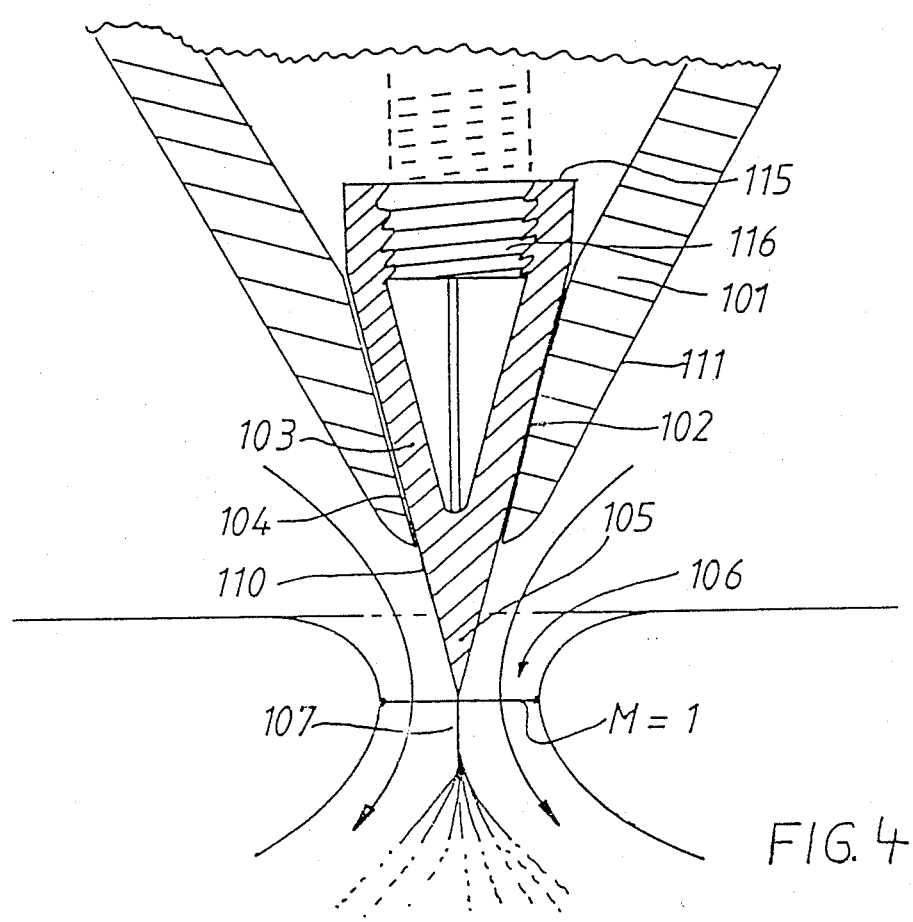
FIG. 4 shows a median longitudinal section through the melting crucible with an annular gap like aperture and the Laval nozzle arrangement.

FIG. 1 diagrammatically shows a cross-section through an apparatus according to the invention in which it is possible to carry out the method according to the invention.

In a container 1, divided by a partition 2 into an upper gas space 3 and a lower gas space 4, is located a crucible 5 with an aperture 6 through which molten material can emerge. The crucible 5 may be made of, for example, quartz glass, sintered ceramics or graphite. Used, for example, for heating the crucible 5 is a resistance heating system 8, embedded, for example, in a ceramics composition 7. The crucible 5 accommodates the molten batch 11. The latter can consist of any metals or metal alloys, particularly iron, cobalt, nickel, chromium, aluminium or the alloys thereof. In particular, it is also possible to obtain iron alloys as powdered metal by the addition of crystallization inhibitors, such as chromium or boron. Also silver, platinum, iridium or their alloys are suitable for use in the method according to the invention.

Fitted in the partition 2 is a shaped part 9 with a passage 10 in it.

The upper gas space 3 comprises at least one propellent gas feed 12. It is particularly expedient to provide several propellent gas feeds 12, distributed over the periphery of the container 1. The lower gas space 4 is provided with a gas discharge 13. The lower gas space 4 is furthermore provided with a sluice or the like, incorporated into a powder discharge pipe 14.

In particular the upper part of the container 1 can be jacketed in a heat insulator 15.

According to the invention, there is a propellent gas feeder funnel 17 in the upper gas space 3 said funnel being surrounded by an inductive heating system 26. The propellent gas feeder funnel 17 has a place of extremely narrow cross-section 21. The propellent gas feed pipe 12 can be provided with a valve (not shown) for adjusting the gas pressure in the upper gas space. Similarly, the lower gas discharge pipe 13 can be provided with a (not shown) delivery pump for adjusting and maintaining the gas pressure in the lower gas space 4.

It is possible to use as propellent gases any gases which do not react with the molten metal. Preferably highly pure inert gases such as helium or argon are used. With metals which do not form hydrides, it is also possible to use hydrogen. With metals which do not form nitrides, nitrogen can be used. Even waste gases from combustion, such as carbon monoxide, can under certain conditions prove favorable.

In the upper gas space 3, there is, for instance, a pressure $p_1$ of 5 atm, while in the lower gas space 4 a pressure $p_2$ of about 1 atm is maintained. The ratio of $p_2:p_1$ ought to be less than 0.5 and should preferably be 0.2.

The propellent gas feeder funnel 17 consists of an electrically-inductively heatable metal, e.g. molybdenum or even of rare metal, e.g. platinum. Its radiated heat is focused on its axis of rotation, on the molten batch located there. The propellent gas feeder funnel 17 has at its bottom end a Laval nozzle shape 18 which coaxially surrounds the molten stream 16 or also part of the conically shaped crucible 5. The heat energy of this inductively-electrically heated rotationally symmetrical construction, as mentioned, is focused on the molten stream 16 extending in its axis.

In desired fashion, the propellent gas 19 is likewise heated by contact with the interface on the inside of the propellent gas feeder funnel 17, thus desirably increasing the friction forces which accelerate the molten stream 16. Since the propellent gas stream 19 is moving in a cross-section which diminishes steadily in the direction of flow, it undergoes such pronounced acceleration in the direction of the narrowest cross-section 21 of the Laval nozzle 18 (where the speed of sound is attained and then exceeded), that it is propelled at velocities of over 100 m/sec.

The slip in relation to the propellent gas jet 19 is then, at this point, approximately 200 m/sec. Due to these high forces of acceleration in the surface of the primary stream of molten material 16, premature breakdown of the stream into secondary molten threads 22 is prevented. Only when the primary stream 16 enters the negative pressure supersonic region does the desired bursting into a bundle of superfine secondary molten treads 22 take place. Only after this has happened is there then-regulated by the radiant heating - a breakdown into tiny balls 23 of a $\mu$m superfine order of sizes, also valid for secondary molten threads 22 which disintegrate due to hydrodynamic instability.

The molten metal in the crucible 5 emerges through the melt outlet 6, the molten stream being subdivided by the effect of the pressure gradient which develops in the gas passage 10. Due to the effect of the propellent gas flowing at supersonic velocity, the molten metal is first drawn out into fibres 22, the fibres 22 and then break down into tiny balls 23.

Cooling occurs in part due to the adiabatic cooling of the propellent gas as it passes through the aperture 10. At high melting temperatures and with very small ball diameters, cooling takes place substantially due to radiation according to the $T^4$ law.

The metal powder 23 which forms is thrown out periodically through the discharge orifice 14 while the gas pressure in the lower gas space 4 is maintained. Feeding of metal into the crucible 5 can be achieved for instance by steady feeling of a metal bar 24 through an aperture 25 in the top of the crucible, the bar melting on contact with the molten batch 11.

The shaped part 9 which forms the gas passage 10 is preferably of heat-resistant material, e.g. ceramic or quartz glass.

In the process of preventing both premature breakdown of the molten stream 16 into coarse powder (diameters of the same order as those of the primary jet 16) and also during bursting of the secondary molten stream 22, consisting of several parallel secondary molten threads, into the superfine powder 23, a favorable factor is structure viscosity, where there is rapid variation in cross section of a single thread. Sharp acceleration over a short path in an axial direction also necessarily causes rapid changes in cross section and thus the above-mentioned structure viscosity, which has the effect of stabilizing the individual thread, so that the superfine threads 22, once they have been formed, last for a short time before the hydrodynamic instability can arise in the expansion zone of the Laval nozzle 18.

The heating of the propellent gas as it passes through the hot propellent gas feeder funnel 17 is especially advantageous, since the molecular viscosity of the propellent gas (as with any gaseous medium) increases sharply as the temperature rises.

FIG. 2 shows a modified embodiment in which the propellent gas feeder funnel 17 comprises a zone 27 of constant cross section before it merges into the Laval nozzle form 18. Consequently, after they emerge from the crucible, the molten threads undergo interface friction as an accelerating force over a fairly long path.

The embodiment shown in FIG. 3 employs a no-crucible melting process, feeder means (not shown) advancing a metal bar 24 right up to the entrance to the Laval nozzle form 18. Inductive heating melts the metal bars 24 and forms a molten stream 16. Under the action of the propellent gas, then, the molten jet 16, after emerging from the Laval nozzle form 18, bursts apart into secondary molten threads 22, which then decompose into powder particles 23 due to dynamic instability.

In the bottom 101 of the crucible according to the embodiment shown in FIG. 4 there is a conical aperture 102 which is pushed axially into a like-angled, i.e. rotationally symmetrical, closure part 103, the tip of which is conical. The conical aperture 102 is closed when the closure part 103 is bearing on the conical face of the aperture. Upon vertical upwards displacement of the closure part 103, an annular gas-shaped aperture 104 is formed, through which the molten material can flow along the surface of the closure part 103 to the conical tip 105 of the closure part 103. During the process of melt outflow, the tip 105 of this closure part 103 projects rotationally symmetrically axially into the inflow zone of a suction nozzle, e.g. of a Laval nozzle as shown generally at 106. The flow material in the region of the conical tip 105 of the closure part 103 is continuously drawn off in the form of a axially symmetrical molten monofilament 107. The quantity of the molten material and thus the thickness of molten material on the outside wall 110 of the closure part 103 can be varied by axial displacement of the closure part 103 in the aperture 102.

Furthermore, FIG. 4 shows that the outside wall 111 of the crucible 101 merges conically and substantially evenly into the outside wall 110 of the closure part 103. Furthermore, it is of essential importance that the outside wall 110 of the closure part is so located in the radiation and effect range of the radiant heating and in the inner zone 1 of the Laval nozzle, so that the tip 105 of the closure part 103 is seated in the region of the narrowest cross section of the Laval nozzle.

For simple adjustment of the axial location of the closure part 103 in relation to the aperture 102, the closure part 103 may have at its end 115, which is inside the crucible, a screwthread 116 by which it can be screwed axially into the underside of the crucible 101.

The invention is not limited to the illustrated features and measures. It also embraces any further developments, modifications and simplifications or partial and sub-combinations of the described and/or illustrated features and measures which fall within the scope of a person skilled in the art.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. Apparatus for producing superfine spherical powder of diameter of about 5–30 pm from molten multifilaments formed from a molten stream of a metal or ceramic material, comprising a container including an upper gas space, a gas feed inlet, a material inlet, and an outlet for gas and molten material;

an axially elongated propellant gas feeder funnel of substantial length extending within said upper gas space to said outlet, said funnel tapering to a zone of most narrow cross-section and defining a rotationally symmetrical Laval nozzle at said outlet, said funnel being formed of a heat conductive refractory material;

gas feeding means for feeding a gas, which is nonreactive with the molten material, through said funnel and through said Laval nozzle in a laminar flow exceeding a supersonic rate downstream of said zone of most narrow cross-section;

molten material feeding means for feeding a stream of molten material through at least a lower part of said funnel to said Laval nozzle which stream then separates into molten multifilaments downstream of said zone of most narrow cross-section, said molten material feeding means comprising a molten material reservoir having a sidewall tapering to an outlet through which the molten material passes as a stream, said molten material outlet being within and spaced from at least a lower part of said funnel and being spaced above the level of said Laval nozzle; and means for superheating the molten material stream as it passes through at least said lower part of said funnel and said Laval nozzle from the side opposite the molten material reservoir and radiating heat from said funnel and said nozzle to said molten stream prior to stream separation into molten multi-filaments.

2. Apparatus according to claim 1 wherein at least said lower part of said funnel is formed of an electrically inductively heatable material, said apparatus further comprising means to inductively heat at least said lower part of said funnel.

3. Apparatus according to claim 2, wherein the funnel material is made of a metal selected from the group consisting of molybdenum, rare earth metals, and platinum.

4. Apparatus according to claim 1 wherein said container further includes a lower gas space, said lower gas space and said upper gas space being separated by a partition, said outlet for gas and molten material extending through said partition; and wherein gas said feeding further comprises means for forming an over-pressure in the upper gas space which is at least twice the pressure in the lower gas space.

5. Apparatus according to claim 1 wherein said molten material reservoir comprises having an outer crucible wall in the upper gas space and heating means for melting material within said crucible.

6. Apparatus according to claim 5 wherein said molten material outlet is in the form of an annular aperture surrounding a conical tip, said conical tip providing surface means for the flow therealong of molten material which has passed through said molten material outlet.

7. Apparatus according to claim 6, wherein the outer wall of the melting crucible merges conically and substantially evenly into the surface means conical tip.

8. Apparatus according to claim 6, wherein surface means conical tip is located within the Laval nozzle.

9. Apparatus according to claim 6, wherein the conical tip has at its inner, crucible end a screwthread by which it can be screwed into an underside of the crucible.

10. Apparatus according to claim 6, wherein the crucible, the Laval nozzle and the conical tip are adjustable in an axial direction and in relation to one another.

11. Apparatus according to claim 6 further comprising means for axially moving said conical tip to vary the size of said molten product outlet.

12. Apparatus according to claim 5 wherein at least said lower part of said funnel is formed of an electrically inductively heatable material, said means for superheating the molten stream comprising means to inductively heat at least said lower part of said funnel.

13. Apparatus according to claim 5 wherein said container further includes a lower gas space, said lower gas space and said upper gas space being separated by a partition, said outlet for gas and molten material extending through said partition; and wherein said means for feeding a gas further comprises means for forming an over-pressure in the upper gas space which is at least twice the pressure in the lower gas space.

* * * * *